Figure 1:
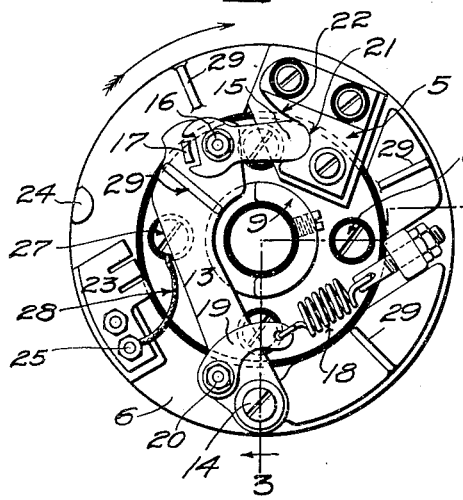

C. L. KENNEDY.
ALTERNATING CURRENT MOTOR.
APPLICATION FILED DEC. 13, 1909.

1,003,465.

Patented Sept. 19, 1911.

2 SHEETS—SHEET 1.

Witnesses:
M. G. Crozier.
H. J. Dummey.

Inventor,
Carlton L. Kennedy
by his Attorneys
Phillips Van Everen & Fish

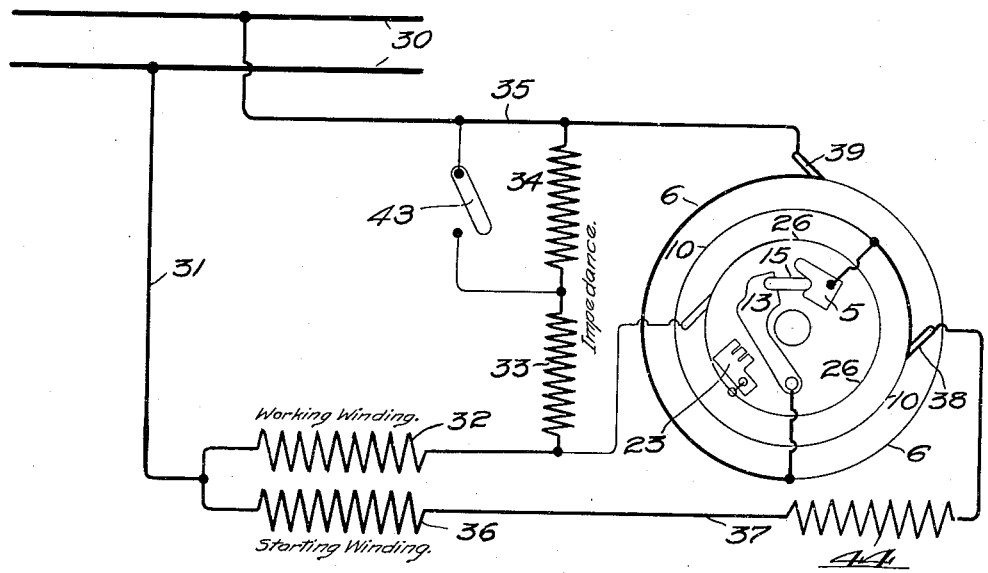
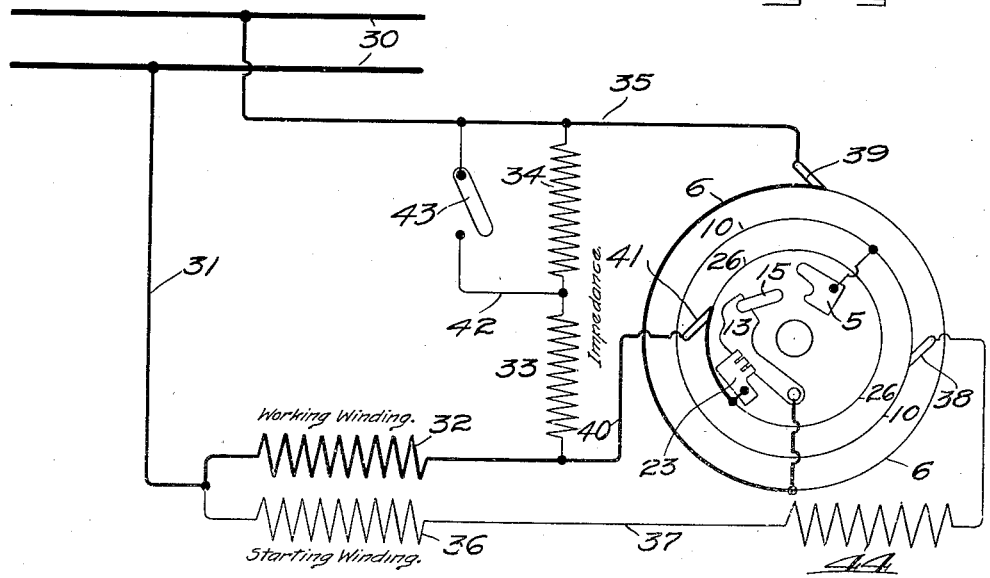

UNITED STATES PATENT OFFICE.

CARLTON L. KENNEDY, OF SOUTH BRAINTREE, MASSACHUSETTS, ASSIGNOR TO THE HOLTZER-CABOT ELECTRIC COMPANY, OF BROOKLINE, MASSACHUSETTS, A CORPORATION OF MASSACHUSETTS.

ALTERNATING-CURRENT MOTOR.

1,003,465.     Specification of Letters Patent.     Patented Sept. 19, 1911.

Application filed December 13, 1909. Serial No. 532,804.

*To all whom it may concern:*

Be it known that I, CARLTON L. KENNEDY, a citizen of the United States, residing at South Braintree, in the county of Norfolk and State of Massachusetts, have invented certain new and useful Improvements in Alternating-Current Motors; and I do hereby declare the following to be a full, clear, and exact description of the invention, such as will enable others skilled in the art to which it appertains to make and use the same.

A split phase motor is a motor of the single phase induction type having a stator provided with two windings, one of these windings, which may be designated as the "working winding", being normally operative when the motor is running, while the other winding, which may be designated as the "starting winding", is used temporarily in starting the motor from a state of rest. The circuits containing these two windings are so arranged that one is of higher reactance than the other, which results in a greater lag in the alternating current flowing through this circuit, and the resulting relative displacement of phase in the two windings causes the production of an irregularly-rotating field in the motor somewhat similar to that in a polyphase motor. The rotating magnetic field subjects the rotor of the motor to a torque which starts it in rotation. When the rotation has reached a sufficient speed, the starting winding is cut out, since the two windings do not work harmoniously at full speed, and therefore, during the normal operation of the motor, the working winding alone is in operation.

The operation of cutting out the starting winding may be performed by hand but it is preferably accomplished automatically, and devices for accomplishing this result through the action of centrifugal force are well known. Such devices, as heretofore constructed or proposed, are incomplete, however, so far as I am informed, in a respect which will be pointed out.

The starting winding and the working winding of the motor are connected in parallel with the source of alternating current by which the motor is fed, and in order to prevent the flow of excessive current through these two windings during starting, it is the practive to introduce a reactance in the working winding and a resistance in the starting winding during the starting period. When the operation of the starting winding is interrupted by cutting out this winding, the impedance of the working winding is not thereby affected, and this impedance, whether in the form of reactance or of ohmic resistance, continues to be effective. In order to prevent the reduction in efficiency in the motor which would result from such impedance if it were permitted to affect the working winding during the normal operation of the motor, means have been employed to cut out this impedance after the motor has started, such means being manually operated after the automatic operation of the switch by which the starting winding is cut out.

The object of the present invention is to produce a self-starting motor in which the starting operations are entirely automatic, no manual operation being required after the operating current has been switched on, and to this end the invention comprises automatic means operating, upon an attainment of a predetermined speed in the rotor, not only to cut out the starting winding, but also to cut out or short-circuit the starting impedance in the circuit of the working winding so as to eliminate this impedance during the normal running of the motor.

The preferred embodiment of my invention is illustrated in the accompanying drawings in which—

Figure 2:
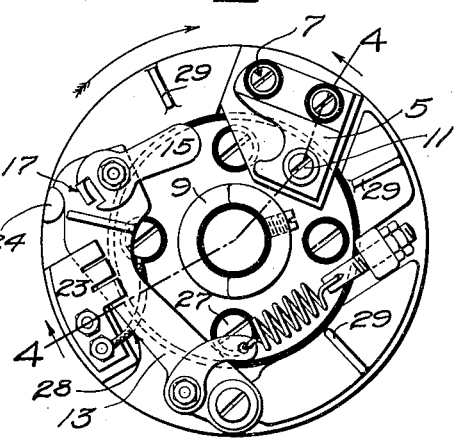
Figure 3:
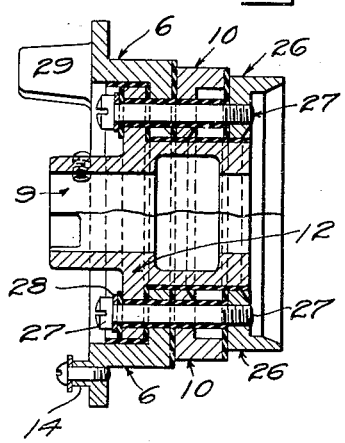
Figure 4:
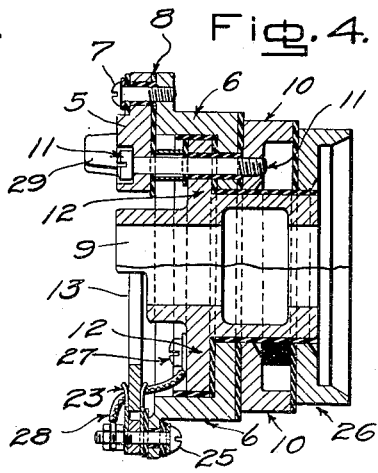
Figure 5:
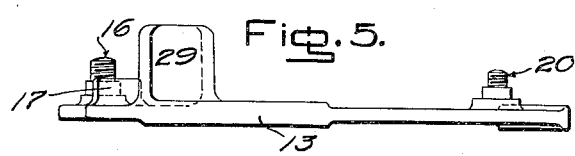

Figure 1 is an elevation of a centrifugal switch adapted to control the stator circuits in a split-phase induction motor arranged in accordance with my invention, this figure showing the switch in starting position. Fig. 2 is a similar elevation of the switch showing it in the position occupied during the normal operation of the motor. Fig. 3 is a sectional view of the switch on the line 3—3, in Fig. 1, with the contact members removed. Fig. 4 is a sectional view of the switch on the line 4—4, in Fig. 2. Fig. 5 is a detail view, on an enlarged scale, of the movable contact arm. Fig. 6 is a diagram illustrating the application of the switch in ployed in connection with any ordinary split-phase motor, showing the switch in starting position, and Fig. 7 is a similar diagram showing the switch in the position occupied during the normal operation of the motor.

The novel construction in which my invention is embodied, as illustrated in the accompanying drawings, resides particularly in the centrifugal switch, which may be employed in connection with an ordinary split-phase motor provided with a starting winding and a working winding. This switch, in so far as its operation upon the starting winding is concerned, is similar, in its operation upon the circuit of the starting winding, to the switch disclosed in the patent to Donald M. Bliss, No. 860,124, granted July 16, 1907. It comprises a fixed contact member 5, which is secured by means of screws 7 to an annular member 6 constituting a base for the switch, but is insulated therefrom by insulating material 8. The base member 6 is mounted upon but insulated from a hub 9, which is adapted to be secured to the shaft of the motor. A screw 11 engaging the fixed contact member 5 passes through the base member 6 and through a flange 12 on the hub 9 and engages an annular member 10, which is also mounted upon the hub 9 but insulated therefrom. The screw 11 is insulated from the hub and from the base member 6 and it constitutes an electrical connection between the fixed contact member 5 and the annular member 10.

The movable contact member comprises an arm 13 which is pivotally mounted upon a pivot pin 14 projecting from the base member 6. At the free end of the arm 13 a short contact piece 15 is mounted upon a pivot pin 16. The contact piece 15 has a bifurcated extremity adapted to engage a lug 17 on the arm 13. This construction is such as to permit the contact piece 15 a swinging movement about the pivot 16 limited by the lug 17. The movable contact member is normally maintained in engagement with the fixed contact member by means of a spring 18 which is adjustably connected at one end to the base member 6. The other end of the spring is connected with the arm 13 through a link 19 pivoted upon the arm 13.

The above-described construction is such that when the switch as a whole is rotated by the rotation of the rotor shaft the centrifugal action upon the movable contact member tends to swing it away from the fixed contact member against the action of the spring 18, so as to disengage the contact piece 15 from the fixed contact member. This action is utilized in breaking the circuit through the starting winding, the spring 18 being adjusted to permit the movement of the movable contact member to occur when the motor attains a predetermined speed.

The fixed contact member is provided with a recess 21 conforming to the end of the contact piece 15 so as to provide a normal butting engagement over a substantial area of contact, and the fixed contact member has also a sliding-contact surface 22 extending from the recess 21. During the first part of the outward movement of the arm 13 the contact piece 15 is swung outwardly by centrifugal action so as to maintain its extremity in sliding engagement with the sliding-contact surface 22. When, therefore, the contact members are finally disengaged, the disengagement occurs at a point removed from the recess 21 so that any arcing which occurs at the instant of disengagement cannot have a destructive effect upon the butting-contact surface through which the contact is normally made.

The means for cutting out the impedance in the working winding of the stator comprises a contact member arranged in the switch in position to be engaged by the movable contact member when the latter is moved as above described by centrifugal action, this engagement operating to short circuit the impedance portion of the circuit of the working winding. As illustrated in the drawings, two spring contact plates 23 are secured to the base member 6 by means of screws 25, but insulated from the base member. When the arm 13 swings outwardly it moves into engagement with the contact plates 23 immediately after disengaging the contact piece 15 from the fixed contact member 5.

The annular members 6 and 10 provide cylindrical contact surfaces, as shown in Figs. 3 and 4, so as to constitute contact rings through which electrical connection may be made between the switch members and the fixed portions of the circuits controlled thereby, by means of contact brushes in the ordinary manner. A third contact ring 26 is provided for connection with the contact members 23. The contact ring 26 is secured upon the hub 9 by screws 27 passing through, but insulated from, the other contact rings, and one of the screws 27 is electrically connected with the contact members 23, by a connector 28.

Vanes 29 are mounted upon the base member 6 and upon the free end of the arm 13 for the purpose of promoting a circulation of air in the motor to prevent overheating, and a stop 24 is also fixed to the base member to limit the outward movement of the arm 13 under the influence of centrifugal action.

The application of the switch illustrated in Figs. 1 to 5, to a split-phase motor is illustrated in Figs. 6 and 7. One of the feed wires 30, by which the motor is supplied with alternating current, is connected through a wire 31 with the two stator windings in parallel. The working winding 32 is connected in series with external impedance coils 33 and 34 and with a return wire 35 connected with the second feed wire 30. When the motor is at rest, therefore, the current flows through the working winding against a high impedance in the coils 33 and 34. These coils may be either resistance coils or reactance coils, but in practice I find it preferable to employ the latter, the corresponding impedance in the starting winding being secured by the introduction of sufficient resistance 44.

From the starting winding 36 the current flows through a wire 37 and a contact brush 38 to the contact ring 10 and thence to the fixed contact member 5 of the centrifugal switch. From the fixed contact member the current flows through the movable contact member to the contact ring 6 and thence through a contact brush 39 to the return wire 35 and back to the feed wire.

With the two stator windings energized as above described, a rotary magnetic field is produced in the motor, and the rotor and the centrifugal switch are started in rotation. When the rotation increases sufficiently to operate the switch as hereinbefore described, the switch assumes the position of the diagram in Fig. 7 and thereby interrupts the flow of current through the starting winding. By the same operation the switch closes a short circuit around the impedance coils 33 and 34. This circuit passes through a wire 40 and a contact brush 41 to the contact ring 36 and thence to the contact members 23. From the latter it passes through the contact arm 13, the contact ring 6 and the brush 39 to the return wire 35. Through this action the working winding is thrown into operation with full effect and without the starting impedance, so that the motor operates with full efficiency when running at normal speed.

Provision is made for adjusting the impedance in the working winding when necessary, and to this end a short-circuit is arranged for cutting out the impedance coil 34. This short-circuit passes through a wire 42 and a movable contact member or switch 43. In starting under heavier loads a less impedance is necessary.

The construction of the rotor and the stator of the split-phase motor are not specifically illustrated or described, as they may be of any well-known or suitable form. The construction of the switch specifically illustrated and described has features of practical value in connection with a split-phase motor. One of such features is the arrangement of the contact rings 6, 10 and 26, side by side and in cylindrical form, while the contact members of the switch proper are arranged substantially in a plane normal to the axis of the motor shaft. This arrangement of the contact rings permits a compact construction and the employment of contact rings of minimum diameter.

While I have described the working and starting windings as applied to the stator of the motor, it will be obvious that the invention is not limited to such an arrangement since a reversal of function is possible in such a motor by which the windings may be embodied in the rotary element or rotor, and in the claims, where I have referred specifically to a stator and a rotor, it will be understood that I do not mean thereby to limit the invention to any specific type of split-phase motor.

My invention is not limited to the embodiment thereof hereinbefore specifically described and illustrated in the accompanying drawings but may be embodied in various other forms within the nature of the invention and the scope of the following claims:—

1. An electric motor, having, in combination, a stator, a rotor, a working and a starting winding upon the stator connected in parallel to a feed wire, an impedance connected between the working winding and a second feed wire, three contact rings mounted upon the rotor, a brush for each contact ring, the brush for the first contact ring being connected to the working winding, the brush for the second contact ring being connected to the starting winding, and the brush for the third contact ring being connected directly to the second feed wire, a double-throw centrifugal switch mounted upon and actuated by the rotor, the switch having two relatively fixed contact members and a relatively movable contact member, one of the relatively fixed contact members being connected to the second contact ring, the second of the relatively fixed contact members being connected to the first contact ring, and the relatively movable contact member being connected to the third contact ring, the movable contact member normally being in contact with the first relatively fixed contact member when the rotor is at rest or at low speed, and being arranged to break contact with the first relatively fixed contact member and to make contact with the second relatively fixed contact member upon the attainment of a predetermined speed by the rotor to cut out the starting winding, and to short circuit the impedance in series with the working winding.

2. An alternating current motor, having, in combination, a stator, a rotor, a working winding and a starting winding upon the stator, three contact rings mounted upon the rotor, a brush for each contact ring, the brushes for the first and second contact rings adapted to be connected to a feed wire through the working winding and the starting winding respectively, and the brush for the third contact ring adapted to be connected directly to a second feed wire, an impedance adapted to form a circuit between the brush for the first contact ring and the second feed wire, a movable element mounted upon the rotor and forming a connection between the second and the third contact rings when the rotor speed is below a predetermined amount, said movable element being adapted to break the connection between the second and third contact rings and to establish a connection between the first and third contact rings upon the attainment of a predetermined speed by the rotor to cut out the starting winding and to short circuit the impedance.

CARLTON L. KENNEDY.

Witnesses:
  ROY T. WELLS,
  MATTHEW PROSKEY.